United States Patent [19]

Einem et al.

[11] 4,158,909

[45] Jun. 26, 1979

[54] METHOD OF MAKING A HEAD FOR A MOSAIC PRINTER

[75] Inventors: Robert E. Einem, Glendale; Joseph A. Richards, Tarzana; Jerzy R. Gassowski, Burbank, all of Calif.

[73] Assignee: International Telephone and Telegraph Corporation, New York, N.Y.

[21] Appl. No.: 875,305

[22] Filed: Feb. 6, 1978

Related U.S. Application Data

[63] Continuation-in-part of Ser. No. 825,409, Aug. 17, 1977, abandoned.

[51] Int. Cl.² ............................................. B23P 11/02
[52] U.S. Cl. ...................................... 29/446; 29/434; 29/526 R; 101/93.05; 400/124
[58] Field of Search ......................... 29/434, 526, 446; 400/124; 101/93.05, 93.34

[56] References Cited

U.S. PATENT DOCUMENTS

| | | | |
|---|---|---|---|
| 2,039,398 | 5/1936 | Dye | 29/446 UX |
| 3,833,105 | 9/1974 | Howard | 400/124 |
| 3,982,622 | 9/1976 | Bellino et al. | 101/93.34 X |
| 4,009,917 | 3/1977 | Yonkers et al. | 29/446 X |
| 4,084,678 | 4/1978 | Reier | 400/124 |
| 4,091,909 | 5/1978 | Lee | 101/93.05 X |

FOREIGN PATENT DOCUMENTS 756392 9/1956 United Kingdom ...................... 29/446

*Primary Examiner*—Charlie T. Moon
*Attorney, Agent, or Firm*—A. Donald Stolzy

[57] ABSTRACT

A plastic laminate including a wedge having sides with a large radius and one or two grooved plates, flat when unstressed, and stressed when clamped to the wedge to conform to the radii thereof. The grooves then are three-dimensional and easily guide the print wires of a mosaic printer. Another advantage is achieved in that both wedge and plates can be molded with little or no difficulty in that the wedge mold surfaces are simple to machine, and the plates are initially flat and thus easy to mold. Close solenoid spacing is also made possible.

7 Claims, 9 Drawing Figures

METHOD OF MAKING A HEAD FOR A MOSAIC PRINTER

BACKGROUND OF THE INVENTION

This application is a continuation-in-part of copending application Ser. No. 825,409 filed Aug. 17, 1977, now abandoned, of the same title and assigned to the same assignee. The benefit of the said filing date is claimed for the common subject matter.

The invention relates generally to teleprinters or the like, and more particularly to a print head for a mosaic printer.

PRIOR ART STATEMENT

In the prior art, much effort has been expended in a continuing search to produce reliable and low cost mosaic or dot-matrix printing heads. The usual electromagnetic thrust-producing device (solenoid) has a relatively long, flexible wire (stylus) associated therewith. Electrical activation of the electromagnetic thrust device drives the wire impact member so that its free end is caused to impact on a surface such as a pressure-sensitive paper. A number n of these wire impact member ends are arranged in a linear array at the printing aperture (terminus), and the surface is moved orthogonally with respect to the line of this array of styli. By appropriate programming which is, per se, well known in this art, these styli are activated one or more at a time in order to make aplhanumeric or other symbolic printouts in dot-matrix form.

Normally, the linear array of styli comprising the actual print-head is relatively small dimensionally. The wires of the impact members are typically on the order of 0.015 inch in diameter.

The solenoids are comparatively large in diameter, and accordingly, there is a problem in respect to the geometry of their arrangement. The solenoids must be spread out or spaced out according to their size or to some arrangement, and the wires must be curved and supported appropriately along their lengths so that they are all compacted and substantially parallel at the printing terminus where contact with the pressure-sensitive surface is located. In the prior art, that particular problem has been addressed variously. For example, in U.S. Pat. No. 3,907,092, two forms of dot-matrix printer heads, one with a linear array of solenoids and the other with a circular array, are illustrated. In general, the circular array may be characterized as an attempt to minimize the curvature required of the wire impact members. In the purely linear arrangement, there is a large difference in the curvature required of the wire impact member from the center of the array (where it is virtually straight) to the outside members. Commonly more than four or five of the solenoid and associated wires are linearly arranged. In this case, the outside wire members are quite sharply curved so that these print wires require a large force to drive them.

The circular solenoid deployment, such as also illustrated in U.S. Pat. No. 3,907,092, partially relieves this problem; however, the wire curvatures must follow relatively complex paths. In U.S. Pat. No. 3,907,092, an attempt is made to support those wire members against bending by a judicious location of some bearings or guide plates. This arrangement, however, leaves most of the length dimension of each wire member substantially unsupported.

In U.S. Pat. No. 3,893,220, the wire member "guide plate" is of the conical type and is referred to as a "nozzle." The nozzle is molded or cast around a plurality of prepositioned core wires which are removed after the material congeals or hardens. In that way, complex curvature is afforded for the individual wire tracks. The print wires are inserted in the tracks after the core wires are removed. The core wires are slightly larger in diameter than the print wires.

Unfortunately, it is a difficult and time-consuming operation to accurately preplace these core wires prior to the casting or molding operation. Also, the amount of hand labor is considerable, since the core wires must be carefully withdrawn in order not to damage the wire passages thus formed. The method does, however, produce a structure which fully supports the wire impact members over substantially their entire lengths, from solenoid to impact end.

Another approach to the problem hereinabove outlined is afforded by the "rocker arm" type mechanism which permits the wire impact member placements to be very nearly parallel and in close proximity. Such arrangements, although generally providing satisfactory operation and life, are expensive to manufacture. Many more parts and assembly steps are required.

U.S. Pat. No. 3,897,865 describes another dot-matrix printing apparatus of the type to which the present invention applies, the solenoid drive members being oriented in a circular configuration and print wires being located about a "concave" conical grooved guide surrounded by a "shell." A grooved shell is also disclosed. The tooling for both of these embodiments is inherently very expensive. A grooved guide is also disclosed.

U.S. Pat. Nos. 3,757,346 and 3,830,976 are useful for understanding the state of the art upon which the present invention builds and, also, for an understanding of other aspects of the dot-matrix (mosaic) print-head art extant to the present time.

The manner in which the present invention deals with the disadvantages of the prior art as aforementioned will be understood as this description proceeds.

SUMMARY OF THE INVENTION

According to one aspect of the present invention, there is provided a mosaic printing head comprising: first means including a first plurality of wire impact members each with an associated first electromagnetic thrust drive device, said first means including a first generally planar wire guide plate containing open grooves guiding said first wire impact members into general convergence in the plane of said first guide plate, said first drive devices being arranged in a linear array along an edge of said first guide plate; second means including a second plurality of wire impact members each with an associated electromagnetic thrust drive device, said second means including a second generally planar wire guide plate containing open grooves in one surface guiding said second wire impact members into general convergence in the plane of said second guide plate, said second drive devices being arranged in a linear array along an edge of said second guide plate; a wedge having an apex and side surfaces; and third means for holding the grooved surfaces of said first and second plates against respective side surfaces of said wedge, closing all of said grooves, said first and second wire impact members having substantially the same direction of convergence toward the apex of said wedge.

According to another aspect of the present invention, there is provided a dot-matrix printing head having an odd number n of wire impact members, each driven by an associated electromagnetic thrust drive device, comprising: a first wire guide plate of resilient material formed in a generally flat form, said first guide plate having a convex edge and (n+1)/2 track grooves extending radially within said plate from said first plate convex edge, said first plate grooves generally converging for a predetermined distance and thereafter extending generally parallel in close spaced relationship; a second wire guide plate of said resilient material formed in a generally flat form, said second guide plate having a convex edge and (n−1)/2 track grooves extending radially within said plate from said second plate convex edge, said second plate grooves generally converging for a predetermined distance and thereafter extending generally parallel in close spaced relationship; means for joining said first and second wire guide plates with the broad generally planar surfaces of each facing each other, including means for causing said planar surfaces to diverge by a predetermined amount at said convex edges; and means for mounting (n+1)/2 of said electromagnetic devices along said convex edge of said first wire guide plate and (n−1)/2 of said electromagnetic devices along said convex edge of said second wire guide plates so that said associated wire members lie in said track grooves of the corresponding plate, said plates being mated at their second ends of opposite said convex edges to array the ends of said n wire members in a linear array.

According to still another aspect of the present invention, there is provided the method of making a guide for the styli of a mosaic printer, said method comprising the steps of: forming first and second plates each having flat surfaces, when unstressed, with open grooves therein fanning out in a predetermined direction from a point of general divergence; forming a wedge having first and second surfaces converging toward an edge such that at least the second wedge surface is concave; and clamping said first and second plate surfaces against said first and second wedge surfaces, respectively, to close all of said grooves in a manner such that said plate surfaces conform to and contour to said wedge surfaces including said concave surface and in positions such that both predetermined directions and both of said points of divergence are generally at the same location.

BRIEF DESCRIPTION OF THE DRAWINGS

In the accompanying drawings which illustrate exemplary embodiments of the present invention.

DESCRIPTION OF THE PREFERRED EMBODIMENTS

Basically, the present invention involves a pair of separately molded wire guide plates made from a resilient material having inherent lubricity, and a molded wedge. The wire tracks (grooves) are molded into the plates with predetermined track curvature and convergence toward the printing terminus (in the plane of the plate). The curvature in the orthogonal plane is provided during assembly as first and second guide plates are clamped to the wedge during assembly. The wedge or wedge block is shaped to deform at least one of the plates outward at the end opposite the printing terminus. This acts to effect the desired orthogonal plane curvature of the track grooves in at least one plate. Both plates provide support for solenoids at their opposite ends. Attachment or mating of the plates is accomplished by fasteners (screws, bolts, etc.) well known in the mechanical arts.

The present invention makes possible a very economical piece part manufacture, the "nozzle" of the device comprising the assembly of the two mated plates with the wedge between them.

The grooves may be on circular arcs. The wedge may have concave side surfaces of a constant radius. Thus, all the molds may be made with simple cuts of constant radii.

A compact head of a small size is also thereby constructed in that the locations of the solenoids on the plates may be staggered.

The foregoing and other novel aspects of the invention will be understood as this description proceeds.

The electrical drive and logic means, as well as the pressure sensitive paper or other image-receiving means, are known in this art and are not a part of this invention per se. Their relationship to the print-head, which is the subject of the present invention, is well understood in this art and needs no amplification herein. The wire impact members, which each include a relatively long, somewhat flexible wire and associated electromagnetic thrust-drive device (solenoid), may be the same as shown in the aforementioned U.S. Pat. No. 3,907,092, for example.

Figure 1:
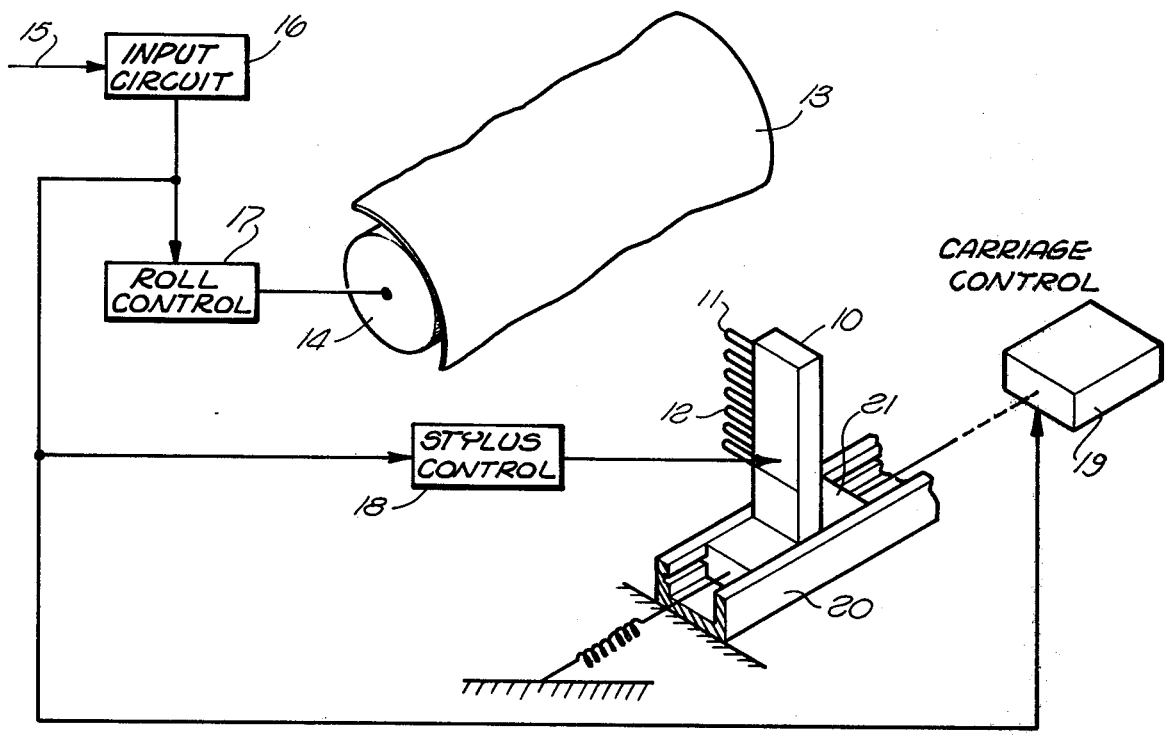
FIG. 1 is a block diagram functionally illustrating the type of dot-matrix printing apparatus to which the present invention applies.

In FIG. 1 a typical pressure-sensitive paper roll 13 is advanced by the rotation of a roller 14 under the influence of a roll control 17. Roll control signals would orginarily cause rotational advancement of roller 14 between the end of each line of print-out and the beginning of the following line, assuming horizontal line-sequential printing. Input signals are provided on 15 and are "sorted out" in an input circuit 16 providing an input to the aforementioned roll control 17 as well as a stylus control 18 and a carriage control 19. The carriage control 19 is in the nature of a mechanical servo-mechanism which advances a print-head carriage 21 carrying a print-head 10, one horizontal space at a time. A track channel 20 acts as a mechanical guide for carriage 21, and therefore the individual (exaggerated in size as depicted) wire impact members, typically 11 and 12, in the print-head housing 10 are moved horizontally, maintaining their alignment as a vertical linear array.

Figure 2:
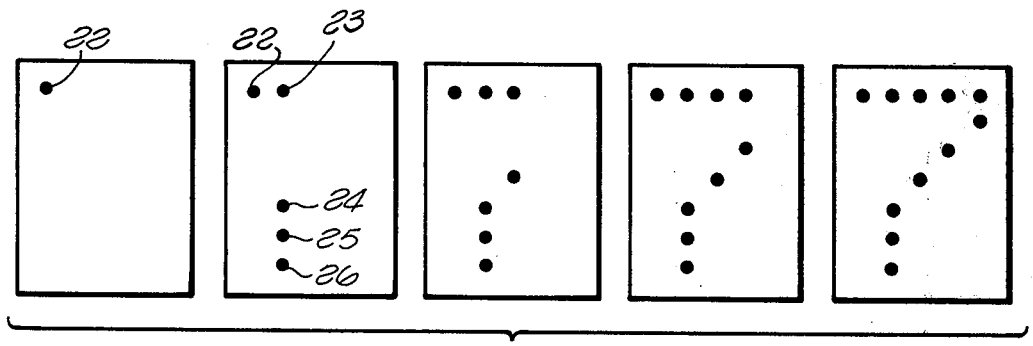
FIG. 2 is a top plan view of a portion of a record medium illustrating the conventional printing of a numeral by a dot-matrix system in accordance with FIG. 1.

Referring also to FIG. 2, the development of a numeral 7 is depicted as a functional example. The first dot 22 is formed by wire impact member 11, and subsequently, the print-head carriage 21 is moved one space horizontally at which time the dots 23, 24, 25 and 26 are printed. The styli 11 and 12 would print the dots 23 and 24, respectively, at that time. The input data at 15 corresponding to the numeral 7 would be appropriately divided into stylus control signals for control 18 and carriage control signals for control 19 to effect the five-column sequence depicted left to right in FIG. 2. The five columnar (horizontal) positions and seven vertical dot positions represented typically in FIG. 2 are, of course, illustrative only. It is to be understood that more or fewer such positions might also be implemented. In connection with the description to follow, it is assumed that the print-head effects 9-dot positions vertically. This is not critical, but well known. The dot width may be conventional.

The apparatus of FIG. 1 is given as background to establish the utility and environment of the present invention. FIGS. 1 and 2 are prior art, as labeled.

Figure 3:
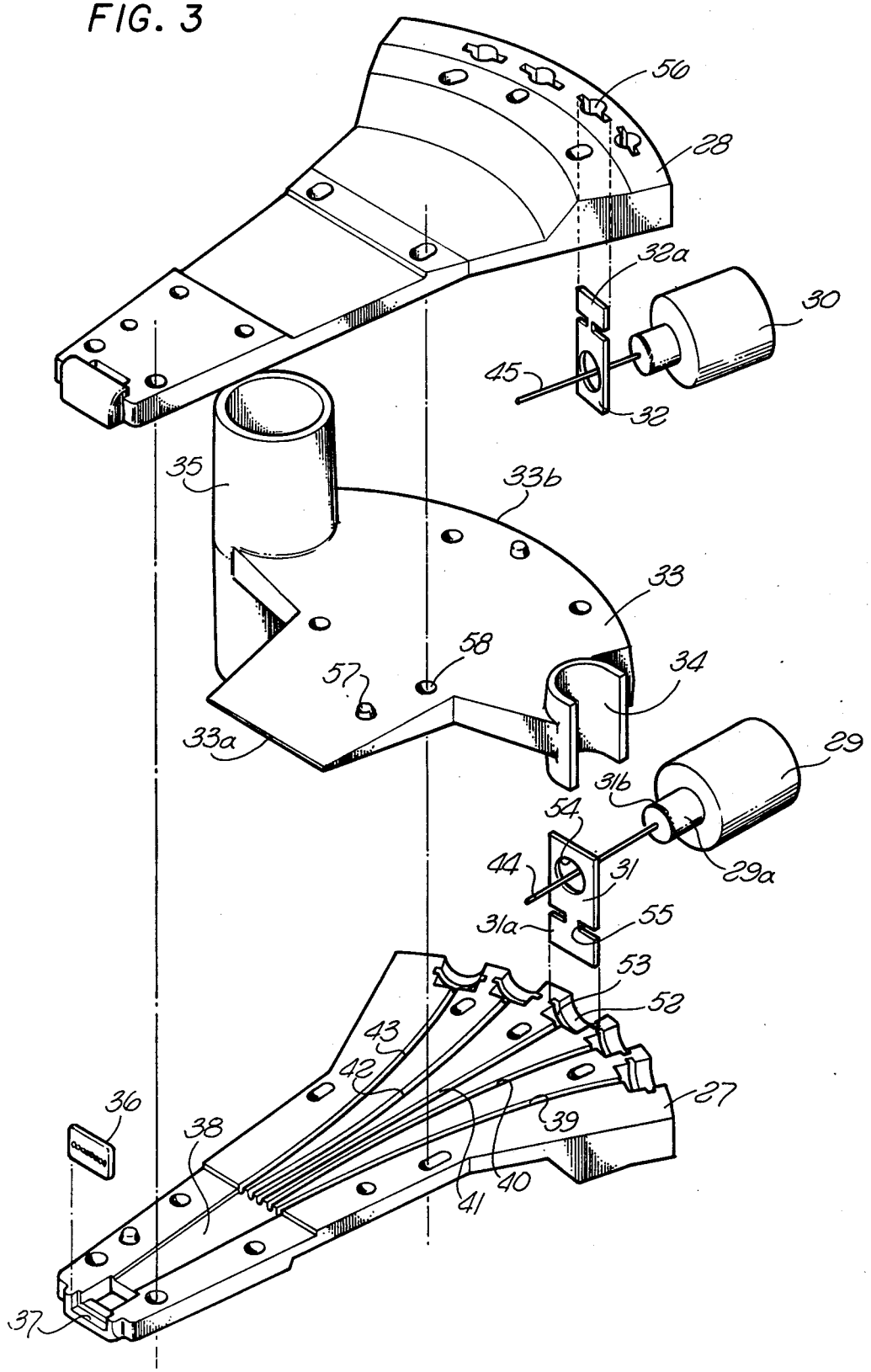
FIG. 3 is an exploded perspective view of a dot-matrix print-head constructed in accordance with the present invention.

In FIG. 3 an exploded perspective view is shown. Two wire guide plates 27 and 28 are shown, these being individually molded in their substantially flat form. In the typical embodiment contemplated in FIG. 3, the plate 27 supports five solenoid assemblies, such as 29, with their associated wire impact members, typically 44. The solenoid necks 29a, for example, each fit into a corresponding indentation, typically 52, and a securing clip member 31 has a hole 54 which fits over neck 29a, its tab end 31a fitting within a slot 53 to secure the solenoid and wire impact member in place in a manner to be more fully described in connection with FIG. 4.

It will be understood that the other four solenoids and wire impact members associated with plate 27 are similarly mounted in the remaining four indentations in plate 27 corresponding to 52. Thus, it will be seen that a wire impact member rides within each of the wire (track) grooves 39, 40, 41, 42 and 43. Groove 41 is straight. Grooves 39, 40, 42 and 43 each lie on the arcs of four respective circles. The circles are approximately tangent to parallel lines where grooves 39–43 are closest together. It will also be realized that the plate 28 contains four more such arrangements, some of which are not illustrated. One of the four includes a solenoid 30 with wire impact member 45 secured by member 32 through a slot 56. The geometry is such that each of the solenoids associated with plate 28 fits within, or is staggered within, the space between each adjacent pair mounted on plate 27. Accordingly, the wire tracks of plate 28 would be positioned approximately midway between pairs of wire tracks of plate 27 (39 and 40, 40 and 41, etc.).

At least one of the plates 27 and 28 is clamped to a wedge member 33. Generally cylindrical integral sleeves 34 and 35 represent only incidental means for one type of mounting of the entire print-head assembly as a movable carriage (see the prior art description in connection with FIG. 1). Sleeves 34 and 35 can ride on bars and slide along under carriage control influence.

Figure 8:
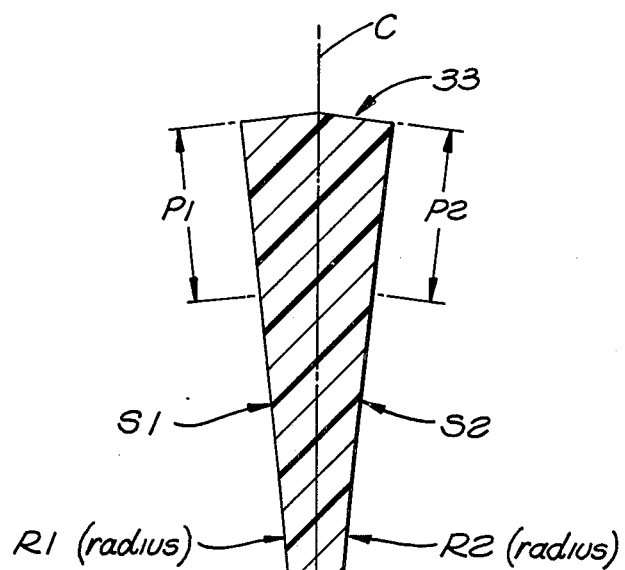
FIGS. 8 and 9 are transverse sectional views of wedges constructed in accordance with the present invention.

It will be noted that the part 33 in FIG. 3 converges from its wide edge 33b to its narrow edge 33a. The side surfaces S1 and S2 which converge preferably have large and equal radii R1 and R2—see FIG. 8. Portions P1 and P2 may be flat and tangent to (a continuation of) surfaces S1 and S2. The section of FIG. 8 is normal to the centerline of edge 33a (FIG. 3). Surfaces S1 and S2 may be tangent to or nearly tangent to centerline C (FIG. 8). An alignment projection 57 (FIG. 4) is one of two or more projections on the part 33 which fits into corresponding dimples or depressions in the plate 28, after which the assembly comprising 27, 28 and 33 are bolted, riveted or otherwise fixed or fastened together through holes, such as 58 and the corresponding holes in 27 and 28. The surfaces of plates 27 and 28 contour to the radii R1 and R2 of wedge 33. Most all grooves are thus defined by variables in three dimensions.

For example the grooves, when considered to be lines, may be defined by Cartesian-like coordinates x, y and z thus $$x = f_a(y)$$

$$x = f_b(z)$$

where none of the projections thereof in the x-y, y-z, z-x planes are straight lines, at least not all the time.

Unstressed, the surfaces of plates 27 and 28 in which the grooves are located are flat. Wedge 33 and plates 27 and 28 and the molds therefor are easy to fabricate because straight lines or circles are employed. Attachment bolts are shown at 47, 48, 49 and 50 in FIG. 4.

The part 33 may be of any mechanically stable, moldable plastic or other castable or formable material. Since this part provides closure of the wire impact member track grooves, such as 39 to 43 on plate 27, and also the track grooves extant in plate 28, inherent lubricity of the material of part 33 is desirable. For the parts 27 and 28, not only inherent lubricity of the material is desirable, but also a certain amount of resilient deformability is required. This is to accommodate the deformation of the parts 27 and 28 by the wedge-shaped member 33 in the assembly depicted in FIG. 4. One particularly suitable, relatively high temperature thermoplastic material which is suitable for plates 27 and 28 is the so-called polysulfone plastic material. That material is readily filled with glass and teflon, these additives are known to provide the dimensional stablility and lubricity of the surfaces so important in the wire member track grooves, respectively. Moreover, that particular thermoplastic is readily injection or compression-molded and, accordingly, it will be realized that the parts 27 and 28 are, therefore, readily manufactured in their flat, undeflected form, much as depicted in FIG. 3, the subsequent assembly with part 33 affording the required compound curvature of the wire impact member track grooves as previously discussed. The part 33 may also be made from the same thermoplastic, and its advantages as aforementioned are of value therefor.

Figure 4:
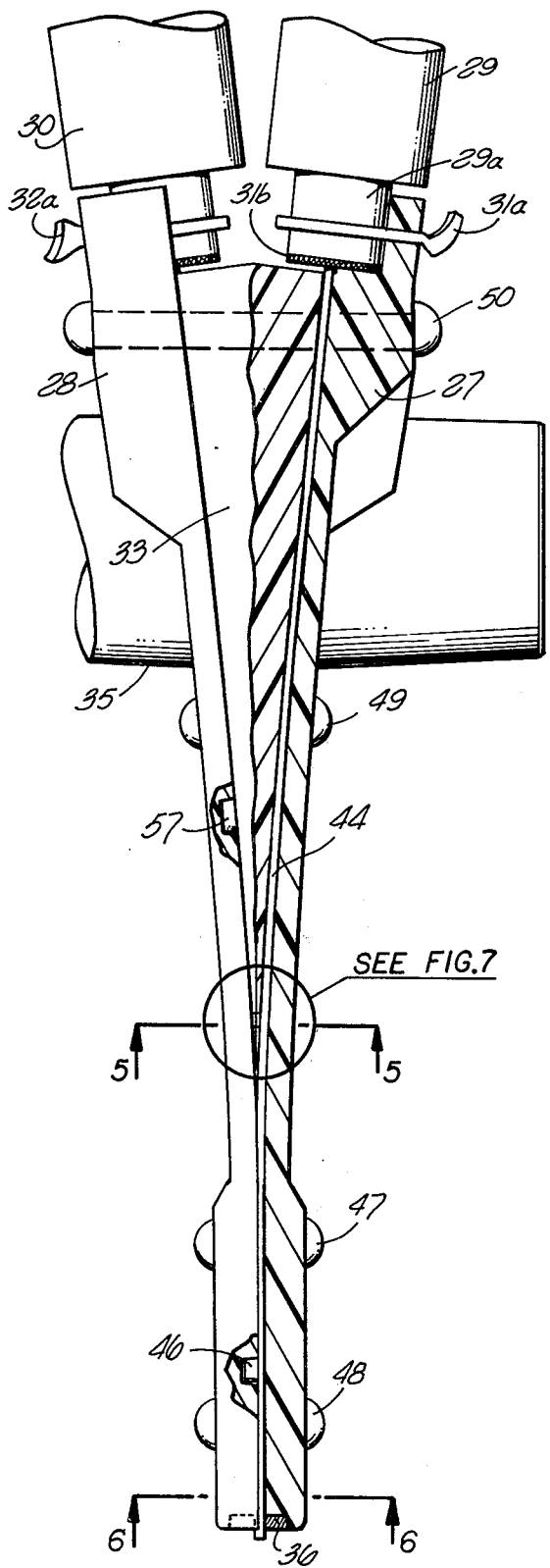
FIG. 4 is an elevational view, partly in section, of a typical matrix print-head as assembled in accordance with the present invention.

From FIG. 4, it will be realized that the solenoid installation clips, such as 31 and 32, having twist tabs 31a and 32a, respectively, provide a very quick, convenient and inexpensive method of holding the solenoid members in place in the assembly. These tabs are shown twisted in FIG. 4, as they would be in assembly. It will be noted from FIGS. 3 and 4 that a band of raised diamond knurling, typically of a width of 90 thousandths of an inch and raised 2 to 4 thousandths of an inch over the OD of 29a, is shown. All other electromagnetic devices (solenoids) of the assembly are to be understood to have substantially the same knurling. This treatment facilitates stable location of the solenoids in cooperation with the residual lateral pressure between solenoid necks and the plates afforded by twisted clip tabs such as 31a. A small enlargement in the grooves receiving these attachment clips, such as at 56 for example, allows for twisting deformation of the necks of these clips (typically 55) as they are twisted to grip their respective solenoids and hold them in place.

It will be noted from both FIGS. 3 and 4 that a bearing block 36 is held in place by a pocket structure, such as 37 in the part 27, in cooperation with a mating pocket in the part 28. This terminal end bearing block is known in the prior art and frequently is made of synthetic ruby material, that material being known as an effective jeweled-bearing material. This particular terminal point is a critical one, since it is the print-head aperture through which the individual wire impact members are driven by their corresponding solenoids to effect the dot-matrix printing.

Figure 5:
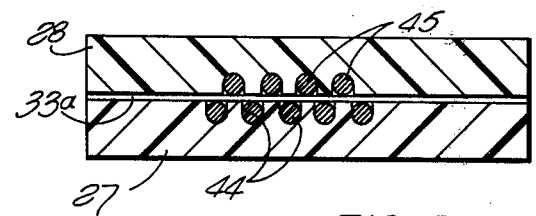
FIG. 5 is a transverse sectional view of the print-head taken on the line 5—5 shown in FIG. 4.
Figure 6:
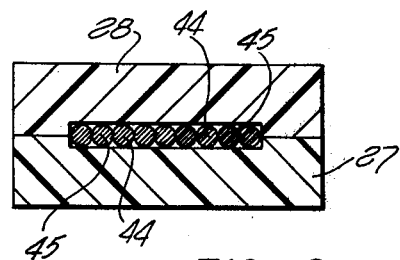
FIG. 6 is a transverse sectional view of the print-head taken on the line 6—6 shown in FIG. 4.
Figure 7:
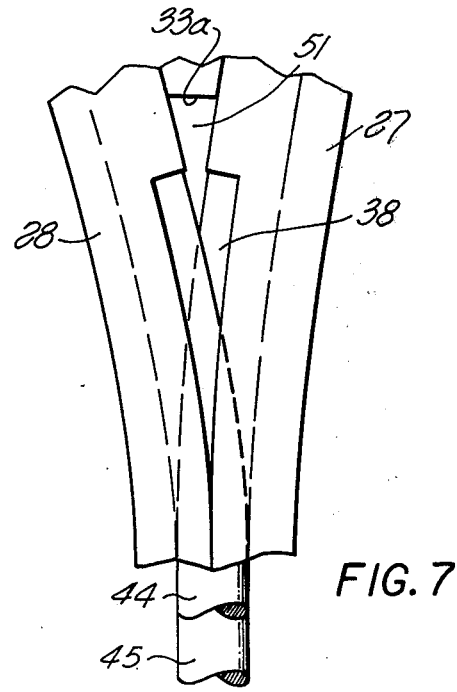
FIG. 7 is an enlarged portion of the view of FIG. 4 and more particularly that within the circle near the section 5—5.

It will be realized from FIGS. 5 and 6, which are taken as cross-sections as indicated on FIG. 4, that there is a convergence among the wire impact members associated with each of the plates 27 and 28 approaching the ruby bearing 36. The final portion of this convergence takes place in the space 38 seen on FIGS. 3, 4 and 7. The relative sizes of the wire impact members in the exaggerated view of FIG. 7 (wires 44 and 45) compared to the depth of the merging recess 38 will be understood from FIG. 7, in that the depth of 38 into each of the plates 27 and 28 is essentially one-half wire diameter. FIG. 7 also makes clear that the "sharp" edge of the wedge on part 33 shown at 33a' need not be as sharp as indicated in FIG. 3 but can be more on the order of the showing of FIG. 7 (realizing, of course, that FIG. 7 is a much enlarged view).

Figure 9:
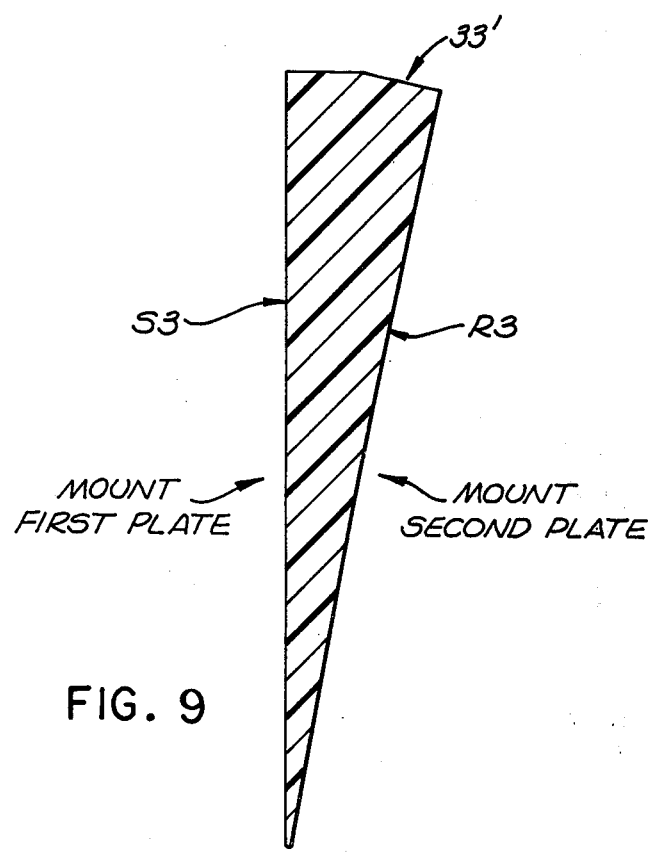

As a variation, it is possible to construct the block 33' with a wedge cross-section shown in FIG. 9 as well as the isosceles-like shape shown in FIG. 4. In FIG. 9 surface S3 is flat and R3 is a large radius (e.g. 17 inches or less.) In that variation, only one of the plates is deflected, the other remaining flat.

During operation of a print-head, such as depicted and described herewith, the ends of the wire impact members projecting through the bearing block 36 may eventually become rounded and require dressing by means of a "stone" or grinding tool to restore their relatively flat impact surfaces. In the combination of the present invention, any or all of the fasteners, such as 31 and 32, may be considered expendable and are readily replaced when the dressed end of the wire impact members require axial relocation of their corresponding solenoid members in order to preserve the clearances to the printing surface adjacent to the bearing block 36.

Another feature of the present invention resides in the fact that the solenoids on plate 27 are located in angular positions in between those carried by plate 28. A compact arrangement is thereby made possible. The maximum radius of curvature of a groove is also thus minimized.

I claim:

1. The method of making a guide for the styli of a mosaic printer, said method comprising the steps of: forming first and second plates each having flat surfaces, when unstressed, with open grooves therein fanning out in a predetermined direction from a point of general divergence; forming a wedge having first and second surfaces converging toward an edge such that at least the second wedge surface is concave; and clamping said first and second plate surfaces against said first and second wedge surfaces, respectively, to close all of said grooves in a manner such that said plate surfaces conform to and contour to said wedge surfaces including said concave surface and in positions such that both predetermined directions and both of said points of divergence are generally at the same location.

2. The method according to claim 1, wherein a plurality of the grooves are formed in each of said first and second plates in a manner to be curvilinear, said plurality of grooves being formed to lie on planar arcs of respective different circles approximately tangent near said points of divergence.

3. The method according to claim 2, wherein said wedge is formed to have an approximately lengthwise uniform cross section approximately normal to said surfaces thereof.

4. The method according to claim 3, wherein said wedge is formed in a manner such that said concave surface has an approximately constant radius throughout.

5. The method according to claim 1, wherein said wedge is formed to have an approximately lengthwise uniform cross section approximately normal to said surfaces thereof.

6. The method according to claim 5, wherein said wedge is formed in a manner such that said concave surface has an approximately constant radius throughout.

7. The method according to claim 2, where said wedge is formed in a manner such that said concave surface has an approximately constant radius throughout.

* * * * *